United States Patent

[11] 3,630,183

| | | |
|---|---|---|
| [72] | Inventor | Jack Hoffman<br>Carmel, Ind. |
| [21] | Appl. No. | 5,606 |
| [22] | Filed | Jan. 26, 1970 |
| [45] | Patented | Dec. 28, 1971 |
| [73] | Assignee | Stewart-Warner Corporation<br>Chicago, Ill. |

[54] DIESEL ENGINE MANIFOLD AIR PREHEATER
3 Claims, 6 Drawing Figs.

[52] U.S. Cl. ..................................................... 123/122 G,
123/142.5 R, 123/179 H
[51] Int. Cl. .............................................. F02m 31/04,
F02n 17/02
[50] Field of Search ........................................ 123/122 D,
122 G, 122, 179 H, 179 G, 142.5

[56] References Cited
UNITED STATES PATENTS

| 1,387,848 | 8/1921 | Good | 123/179 H |
| 2,225,647 | 12/1940 | Liekendael | 123/122 G UX |
| 3,024,777 | 3/1962 | Baker | 123/122 G |
| 3,526,214 | 9/1970 | Kamo | 123/179 H X |
| 3,534,723 | 10/1970 | Tramontini | 123/179 G |

*Primary Examiner*—Al Lawrence Smith
*Attorneys*—Augustus G. Douvas, William J. Newman and Norton Lesser ABSTRACT: An air preheater preferably associated with an intercooler mounted and lengthwise of air intake manifold; and including an elongated burner tube mounted in and lengthwise of the manifold and provided with a plurality of longitudinally spaced apertures, and a burner head assembly at one end of the burner tube.

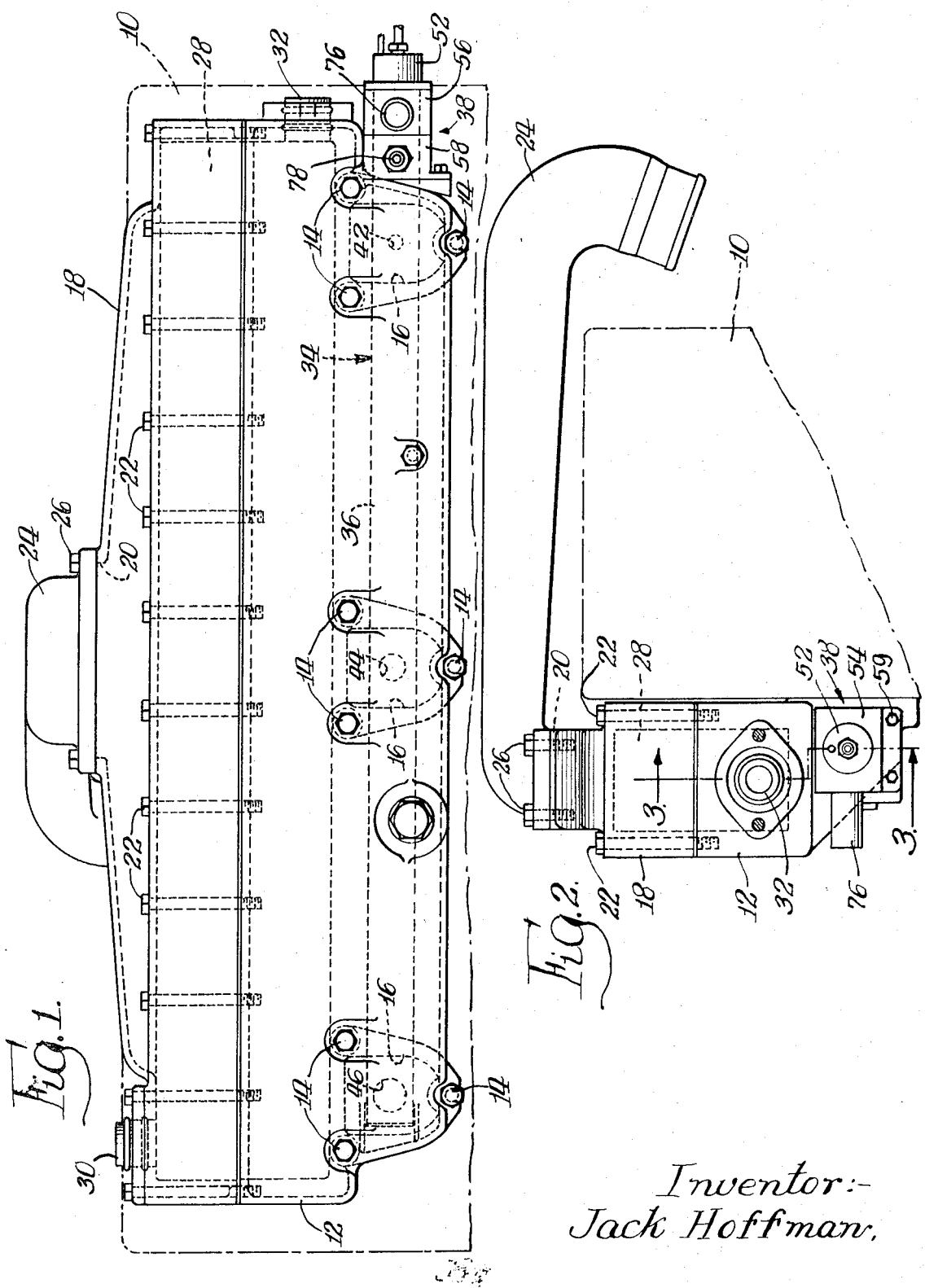

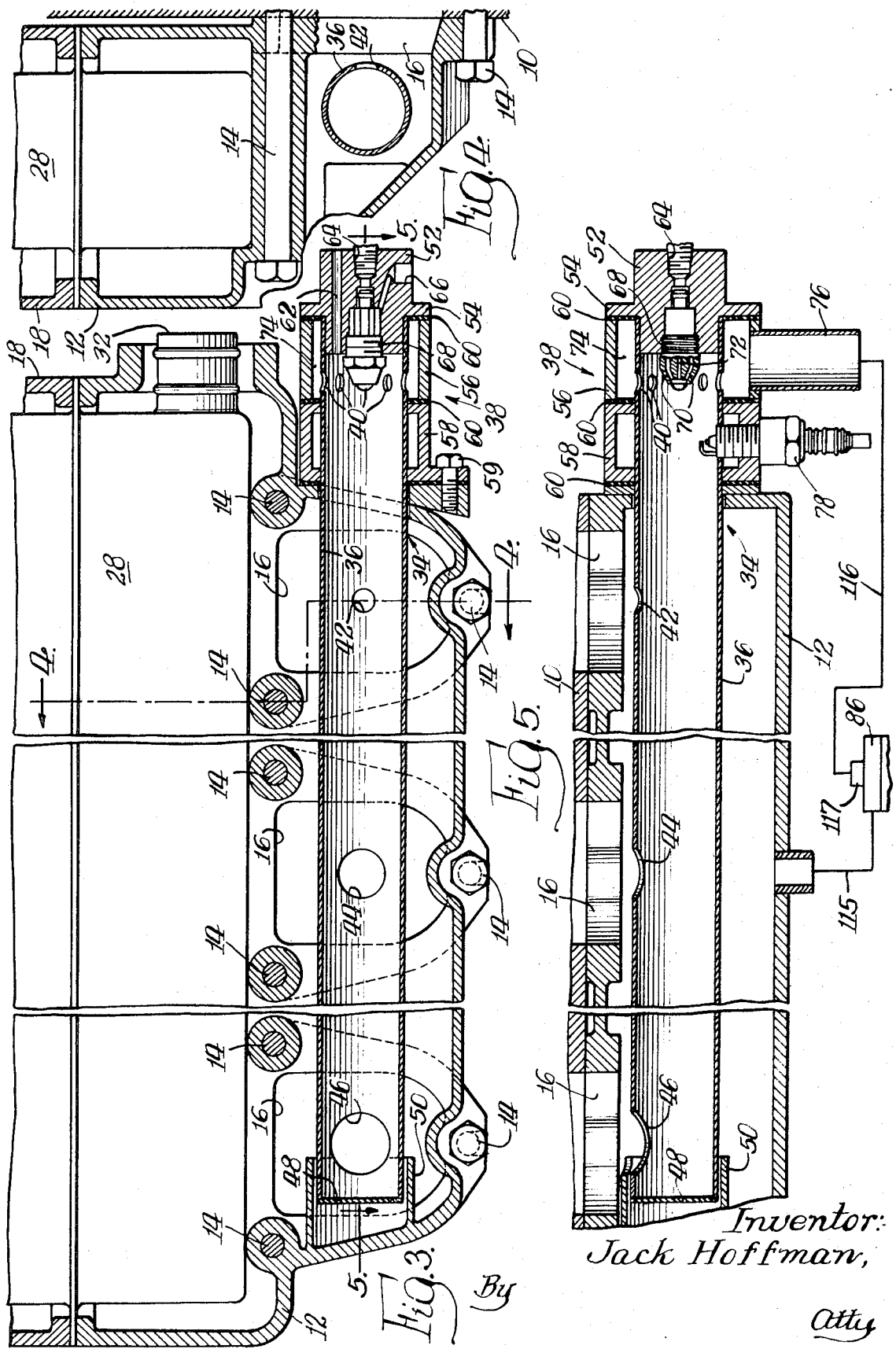

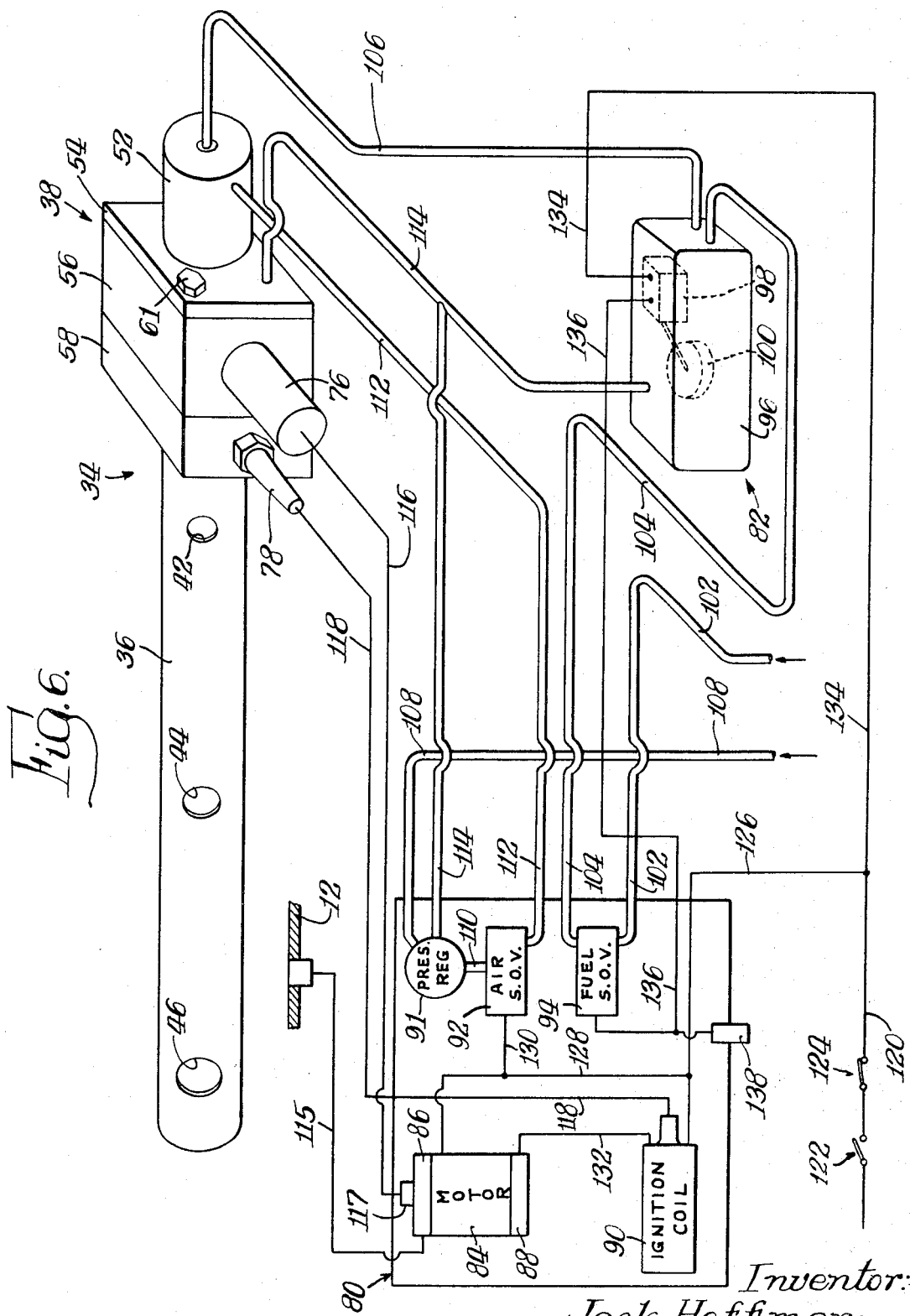

3,630,183

1

DIESEL ENGINE MANIFOLD AIR PREHEATER

BACKGROUND OF THE INVENTION

The present invention pertains to an air preheater mounted in the air intake manifold of a Diesel engine, and a control system for the preheater.

Due to the difficulty of starting Diesel engines in cold weather, it is usually necessary to preheat the engine intake air. Heretofore, various types of preheaters have been incorporated in the inlet line of the air intake manifold for preheating air before entry into the manifold. Such preheaters have not proved to be entirely satisfactory. They are not accompanied by optimum combustion and flame stability, and do not provide air of uniform heat throughout the manifold and particularly at each manifold outlet communicating with the engine piston cylinders. Moreover, in some diesel engines, an intercooler is connected in the cooling system mounted in the intake manifold to transfer heat from the liquid coolant flowing through the intercooler to the air flowing around the intercooler through the manifold.

Existing preheaters, especially those incorporated in the inlet of the manifold, are not compatible with a consolidated intercooler-manifold arrangement.

SUMMARY OF THE INVENTION

The preheater of the present invention comprises an elongated burner tube and a burner head assembly. The burner tube is mounted in and lengthwise of an air intake manifold, is adapted to be located beneath an intercooler also mounted in the manifold, and is provided with a plurality of longitudinally paced apertures aligned with the manifold outlets. The burner head assembly includes a head member supporting a fuel nozzle and having a fuel passageway and an aspirating air passageway, a first collar supporting a spark plug, and second collar with an inlet and defining a combustion air chamber communicating with the interior of the burner tube.

The fuel passageway is connected to a static fuel supply which comprises a fuel tank adapted to receive fuel from a source of fuel through a solenoid-operated fuel valve controlled by a switch operated by a float responsive to the level of fuel in the tank. The aspirating air passageway is connected to a source of pressurized air through a pressure regulator and a solenoid operated air valve. The combustion air inlet is connected to an air compressor operated by an electric motor which also operates a breaker point assembly associated with an ignition coil connected to the spark plug.

The above-described preheater can be mounted directly in the manifold; is compatible with an intercooler mounted within the manifold and is especially adapted for heating air after it has passed the intercooler; selectively preheats air at the time of starting, or subsequent to starting, of the diesel engine; and provides optimum combustion, flame stability and uniform heating of the air at the manifold outlets. And, by reason of the fuel-air supply and control system, the preheater does not interfere with the operation and delivery of fuel to the engine fuel injectors, or the proper fuel and air mixture required by the engine itself.

BRIEF DESCRIPTION OF THE DRAWINGS

FIG. 1 is a side-elevational view of a diesel engine air intake manifold in which is mounted an intercooler and an air preheater in accordance with the present invention;

FIG. 2 is an end elevational view of the manifold of FIG. 1;

FIG. 3 is an enlarged and foreshortened longitudinal sectional view taken substantially along the line 3—3 in FIG. 2, looking in the direction indicated by the arrows;

FIG. 4 is a transverse sectional view taken substantially along the line 4—4 in FIG. 3, looking in the direction indicated by the arrows;

FIG. 5 is a foreshortened longitudinal sectional view taken substantially along the line 5—5 in FIG. 3, looking in the direction indicated by the arrows; and FIG. 6 is a perspective view of the preheater, and a schematic view of the fuel-air supply and control system, of the present invention.

DESCRIPTION OF THE PREFERRED EMBODIMENT

Referring now to FIGS. 1–4, there is indicated by the reference numeral 10 the engine block of an internal combustion or compression ignition diesel engine. A longitudinal intake manifold 12 is secured by bolts 14 to the engine block 10 along one side thereof, and is provided with a plurality of air outlets 16 which communicate through passageways in the engine block to interior piston cylinders. A manifold cover 18, which includes a central air inlet 20, is secured by bolts 22 to the manifold 12 along the top thereof. A crossover connector 24 is connected at its one end by bolts 26 to the air inlet 20 and at its other end to the discharge side of a supercharger and/or an air filter assembly (not shown). Seated within the manifold 12 and manifold cover 18 is a longitudinal intercooler 28 having a coolant inlet 30 projecting through the top wall of the cover 18 and a coolant outlet 32 projecting through the end wall of the manifold 12. The inlet 30 and outlet 32 are suitably connected in the cooling system of the diesel engine. When the diesel engine 10 is operating, the intercooler 28 serves as an auxiliary cooler for the liquid coolant of the engine, and, concomitantly, adds heat to the air flowing around the intercooler through the cover 18 and manifold 12 to the engine piston cylinders.

As best shown in FIGS. 3 and 5, a manifold air preheater or burner unit 34, comprised of a cylindrical elongated burner tube 36 and a burner head assembly 38, is mounted in the manifold 12 beneath the intercooler 28. The burner tube 36 is provided with a plurality of circumferentially spaced ports 40 adjacent its front end. A plurality of longitudinally spaced apertures 42, 44 and 46, and a closed rear end 48 which projects into a retainer collar 50 at the adjacent end of the manifold 12. The apertures 42, 44 and 46 are located one adjacent each of the manifold air outlets 16, and increase in size from the front to the rear of the burner tube 36. The burner head assembly 38 includes a head member 52 with a radial flange 54, a collar 56, a collar 58 secured to the manifold 12 by bolts 59, intervening gaskets 60, and assembly bolts 61 (FIG. 6). The head member 52 is formed with a vent passageway 62, a fuel passageway 64, and an air passageway 66 which intersects the fuel passageway 64. Threaded into the inner end of the fuel passageway 64 is an aspirating nozzle 68 having air ports 70 which communicate with air passageway 66 and a central port 72 which communicates with fuel passageway 64. The collar 56 surrounds the burner tube ports 40, defines with the burner tube 36 an annular combustion air chamber 74, and has secured therein a radial air inlet tube 76. The collar 58 supports a radial spark plug 78 which projects through the wall of the burner tube 36.

Referring now to FIG. 6, there is shown the burner unit 34 and the fuel-air supply and control system therefore which includes a primary control unit 80 and a fuel control device 82 forming part of a static fuel supply. The primary control unit 80 comprises an electric motor 84 adapted to drive an air compressor 86 and a breaker point assembly 88, an ignition coil 90, an air pressure regulator 91 such as a spring loaded diaphragm type, a normally closed solenoid-operated air valve 92, and a normally closed solenoid-operated fuel valve 94. The fuel control device 82 comprises a closed tank 96, a switch 98, and a switch operating float 100 movable vertically with the level of liquid fuel in the tank 96.

Fuel is adapted to be conveyed to the fuel passageway 64 of the burner unit 34 through a conduit 102 connected to the engine fuel pump, the valve 94, a conduit 104, the fuel control device 82, and a conduit 106. Aspirating air is adapted to be directed to the air passageway 66 of the burner unit 34 through an inlet conduit 108 connected to the vehicle air brake tank or other suitable source, the pressure regulator 91, a conduit 110, the valve 92, and a conduit 112. A vent conduit 114 also extends from the vent passageway 62 of the burner unit 34 to both the pressure regulator 91 and the fuel control device 82. Combustion air is adapted to be directed to the air inlet tube 76 of the burner unit 34 from the air compressor 86 through a conduit 116. The inlet to the air compressor 86 is preferably connected to manifold 12 through a conduit 115. This is especially true of the engine utilizes a supercharger because otherwise the high-supercharged air pressure could be lost from the manifold through the compressor inlet and the air compressor 86. A slightly restricted orifice 117 is provided in this connection to stabilize the air flow to the burner tube over widely fluctuating intake air pressures. In addition, it saves the need of another air filter since the manifold air is already cleaned by the engine's regular filter. Also, a high-tension cable 118 interconnects the ignition coil 90 and the spark plug 78.

The electrical circuit of the control system includes a primary line 120 connected to a source of power. Interposed in the line 120 is a remote manually operable starter switch 122, and a normally closed switch 124 mounted in association with the engine cooling system and automatically operable in response to the temperature thereof. A line 126 interconnects the line 120 and the ignition coil 90, a line 128 interconnects the line 126 and the motor 84, and a line 130 interconnects the line 128 and the air valve 92. The breaker point assembly 88 and the ignition coil 90 are interconnected by a line 132. A line 134 also interconnects he primary line 120 and the switch 98 of the fuel control device 82, while the switch 98 and fuel valve 94 are interconnected by a line 136 which includes a diode 138 for spark suppression.

When the starter switch 122 is closed to initiate operation of the burner unit 34, the motor 84 is energized for operating the air compressor 86 to supply pressurized combustion air to the inlet tube 76 and for operating the breaker point assembly 88, the breaker point assembly 88 and the ignition coil 90 are energized for effecting sparking of the spark plug 78, the normally closed air valve 92 is opened to permit the flow of pressurized aspirating air to the air passageway 66 and the nozzle 68, and the fuel valve 94 is conditioned for controlling the flow of fuel to the fuel control device 82.

The pressurized aspirating air directed to the air passageway 66 and nozzle 68 serves to draw fuel into the fuel passageway 64 and central nozzle port 72 from the fuel control device 82 and causes the aspirated fuel to be discharged by the nozzle 68 in atomized form. The discharged fuel mixes with combustion makeup air directed through the air inlet tube 76, chamber 74 and ports 40, and the resultant fuel-air mixture is ignited by the spark plug 78. The primary flame generated by ignition propagates down the length of the burner tube 36 and thereby heats the latter which in turn heats the manifold air flowing to the engine piston cylinders. In addition, the burner tube apertures 42, 44 and 46 permit emission of short flames to directly heat the manifold air and accommodate exhaust of the burner tube 36 into the diesel engine combustion system. The increase in size of the tube apertures 42, 44 and 46 from the ignition end of the tube 36 to the closed end corresponds inversely to the decrease in the heat of the primary flame moving away from the area of ignition With this arrangement, the short flames emanating from the apertures 42, 44 and 46 provide approximately the same amount of heat for the air passing through the manifold outlets 16.

During operation of the preheater 34, the pressure regulator 91, which receives through the inlet 108 air under pressure varying in the range of 50 to 150 p.s.i.g., serves to maintain a substantially constant rate of flow of aspirating air to the nozzle 68 at substantially a constant pressure of 3 p.s.i.g. As fuel is drawn from the tank 96 through the conduit 106, the float 100 falls and closes the switch 98 which in turn opens the fuel valve 94. Fuel, which is received by the valve 94 from a fuel source at a pressure of up to 450 p.s.i.g., is slowly metered through the valve 94; and, as fuel is supplied to the tank 96 through the conduit 104, the float 100 rises and opens the switch 98 which in turn closes the valve 94. In this manner, the level of fuel within the tank 96 is maintained substantially constant, preferably at about 1 inch below the centerline of the nozzle 68 so as to prevent fuel leakage from the tank 96 into the burner when the unit is not operating. The venturi effect of the expanding air from ports 70 of nozzle 68 draws the fuel through port 72 and into the combustion chamber. The vent conduit 114 serves as a pressure equalizer to compensate for very large manifold air pressure changes resulting from the use of an engine supercharger, and thereby insures a constant aspirating air pressure of 3 p.s.i.g., and a constant rate of fuel flow, at the nozzle 68. With the manual switch 122 closed, the preheater 34 operates, under automatic control, at starting of the engine, at idling speeds, and at high speeds under very light load conditions. In this connection, until the cooling system liquid reaches a predetermined temperature corresponding to a predetermined manifold air temperature, the temperature operated switch 124 remains closed and the preheater 34 remains operative; when the cooling system liquid reaches the predetermined temperature, the switch 124 opens whereupon the motor 84 and ignition coil 90 are deenergized and the air valve 92 is closed; when the cooling system liquid falls below the predetermined temperature, the switch 124 closes, the motor 84 and ignition coil 90 are energized and the air valve 92 is opened.

While there has been shown and described a preferred embodiment of the present invention, it will be understood by those skilled in the art that various rearrangements and modifications may be made therein without departing from the spirit and scope of the invention.

I claim:

1. For use with a diesel engine having longitudinally spaced intake ports, the combination of an air intake manifold extending longitudinally and transversely of said ports for communicating intake manifold combustion air to said ports, an intercooler mounted within said manifold and extending longitudinally of said ports upstream of said ports, an elongated burner tube in said manifold spaced adjacent said ports downstream of said intercooler and extending longitudinally of said ports with one end of said tube extending through one wall of said manifold, a burner head assembly at said tube one end external to said manifold, an aspirating fuel nozzle having a longitudinal axis coaxial with said tube in said burner head assembly, ignition means in said head extending radially into said tube between said nozzle and manifold wall for igniting fuel discharged by said nozzle, a plurality of passageways in said tube with each passageway positioned adjacent to and facing a respective intake port with said passageways increasing in size from the end of said burner tube adjacent said burner assembly to provide substantially the same quantity of heat to the air entering each said ports from said manifold, fuel port means in said nozzle, aspirating air port means in said nozzle, a fuel passageway in said burner head assembly for communicating fuel with said nozzle fuel port means, an aspirating air passageway in said burner head assembly for communicating air to said aspirating air port means, a fuel tank, means for communicating fuel in said tank to said head fuel passageway, a source of pressurized air, means connecting said burner head assembly aspirating air passageway to said source of pressurized air, a combustion air chamber in said burner head assembly coaxial with said tube communicating with the interior of said burner tube, another inlet air passage in said head assembly extending radially of said tube for communicating air to said combustion chamber, an air compressor supplying pressurized air from said manifold at a position intermediate the ends of said tube to said other head inlet, a breaker point assembly, an ignition coil connected to said ignition means, means for energizing said ignition coil for controlling said ignition means to ignite said fuel in response to the operation of said breaker point assembly, and a common electric motor for operating said breaker point assembly and said air compressor.

2. The assembly claimed in claim 1 in which said means connecting said source of pressurized air to said aspirating air passageway comprises a solenoid operated air valve for controlling the supply of air from said source of pressurized air to said air aspirating passageway, a pressure regulator connected between said source of pressurized air and said air valve, and air venting means are connected between said fuel tank, said pressure regulator and the interior of said one end of said burner tube for controlling the air supplied to said burner head.

3. In an engine having longitudinally spaced intake ports and an air intake manifold extending longitudinally and transversely of said ports, an intercooler mounted in said manifold spaced upstream of said ports and extending longitudinally of said ports, a manifold air preheater comprising an elongated burner tube in said manifold downstream of said intercooler extending longitudinally of said ports adjacent said ports with one end of said tube extending through one end wall of said manifold, said burner tube being provided with a plurality of longitudinally spaced apertures each adjacent a respective one of said ports for heating air in said manifold, a burner head at said one end of said burner tube located exteriorly of said manifold, a fuel nozzle mounted in said head coaxially of said tube and having a fuel and air passageway, said burner tube provided with a plurality of circumferentially spaced ports exterior to said manifold and adjacent said nozzle, a first annular collar encircling said tube and spaced axially intermediate said tube ports and said manifold, a spark plug extending radially through said first collar into said tube, a second collar intermediate said first collar and said head member encircling said ports and spaced from said tube to define a combustion chamber coaxial with said tube, and means for delivering combustion air through said second collar to said combustion chamber.

* * * * *